United States Patent [19]
Baloche et al.

[11] Patent Number: 5,522,665
[45] Date of Patent: Jun. 4, 1996

[54] SLIDE FOR ADJUSTING THE LONGITUDINAL POSITION OF AN AUTOMOBILE SEAT

[75] Inventors: François Baloche; Yann Reubeuze, both of Flers, France

[73] Assignee: Bertrand Faure France, Boulogne, France

[21] Appl. No.: 407,093

[22] Filed: Mar. 20, 1995

[30] Foreign Application Priority Data

Mar. 24, 1994 [FR] France .................................. 94 03470

[51] Int. Cl.$^6$ .................................................. F16C 29/04
[52] U.S. Cl. .............................. 384/47; 296/65.1; 384/34
[58] Field of Search ................................. 384/47, 34, 49, 384/17, 38; 296/65.1

[56] References Cited

U.S. PATENT DOCUMENTS

| 4,863,289 | 9/1989 | Lecerf | 384/47 |
| 5,222,814 | 6/1993 | Boelryk | 384/47 |
| 5,370,350 | 12/1994 | Okano et al. | 384/47 |

FOREIGN PATENT DOCUMENTS

| 484024A1 | 5/1992 | European Pat. Off. . |
| 2098852 | 3/1972 | France . |
| 2286723 | 4/1976 | France . |
| 2282349 | 5/1979 | France . |
| 2390625 | 10/1981 | France . |
| 334696 | 9/1989 | France . |
| 2605997 | 2/1976 | Germany . |
| 2545763 | 4/1977 | Germany . |

Primary Examiner—Lenard A. Footland
Attorney, Agent, or Firm—Morgan & Finnegan

[57] ABSTRACT

The slide comprises an inner profile member and an outer profile member. The inner profile member has a U-shaped cross-section extended by arcuate parts. The outer profile member comprises an upper plane portion edged in a symmetrical manner with respect to a median vertical axis X-X1 by first guiding paths extended by connecting parts linking together the first guiding paths with second guiding paths. Sliding or rolling members are inserted both between the first guiding paths and the arcuate paths and between the arcuate parts and the second guiding paths.

8 Claims, 1 Drawing Sheet

SLIDE FOR ADJUSTING THE LONGITUDINAL POSITION OF AN AUTOMOBILE SEAT

FIELD OF THE INVENTION

This invention relates to a slide for adjusting the longitudinal position of an automobile seat.

BACKGROUND OF THE INVENTION

Mechanical devices are known for a long time, which mechanical devices are called slides for adjusting the longitudinal position of a seat in a vehicle, and in particular in an automobile vehicle.

Each slide is more often formed by a first profile member having a substantially U-shaped section which is upwardly open and secured onto the floor of the vehicle while a second profile member has a cross-section which is also substantially of a U-shape but open downwardly. The second profile member is placed in opposition to the first profile member, with sliding or rolling members being interposed between the first and second profile members for enabling the outer profile member to slide on the inner profile member. Moreover, the outer profile member is connected by suitable means to the seat of the corresponding vehicle, in order to allow a longitudinal adjustement of this seat according to morphology of the user.

Such slides are described and shown in particular in French patent 2,390,625; French patent 2,098,852; French patent 2,286,723; German patent 2,545,763; as well as in French patent 2,282,349.

However, these slides have not been found satisfactory since it has not been possible, up to know, to meet requirements which are often contradictory and which can be summarized as follows:

a) a sliding force which should be the smallest as possible despite geometrical defects of the vehicle floor, which sliding force is the force which is necessary for moving one profile member relatively to the other;

b) these slides must be noiseless and must have, if possible, only a small clearance or even no clearance at all in order to improve the comfort of the passengers of the vehicle; and c) a good rigidity of the assembly of the slide because these slides cooperate for protecting the passengers in case of impacts or accidents; actually, in modern type vehicles, most of the seats are fitted with embarked safety belts, which means belts fixed to the considered seat and, therefore, the slides are subjected, in case of impacts or accidents, to very great tearing or twisting forces that they must absorb in order to avoid, the more as possible, more or less serious damages for the passengers.

But a good rigidity is not compatible with a low sliding force and with the taking up of environmental defects. Actually, the presently used profile members are either sufficiently flexible for absorbing the defects, or they are rigid; but in this later case the defects are not absorbed and a clearance is necessary for permitting a low sliding force.

PURPOSE AND SUMMARY OF THE INVENTION

The present invention relates to providing a rigid slide which is free from environmental defects, while necessitating a very low sliding force, and having a noiseless movement without clearance.

According to the invention, the slide for adjusting the longitudinal position of an automobile seat is formed by an inner profile member and an outer profile member, and is characterized in that:

a) the inner profile member has a U-shaped cross-section extended by arcuate parts;

b) the outer profile member comprises an upper plane portion edged in a symmetrical manner, with respect to a median vertical axis, by first guiding paths extended by connecting parts linking together these first guiding paths with second guiding paths, sliding or rolling members being inserted between the first guiding paths and the arcuate parts, then between these arcuate parts and the second guiding paths, these arcuate parts thereby permitting a slight relative rotation movement of the inner and outer profile members.

According to another feature of the invention, the outer profile member comprises a groove between each end of the upper plane portion and the first guiding paths, which groove increasing an envelope for the sliding or rolling members placed between the first guiding paths and the arcuate parts.

Finally, according to other features of the invention:

a) the arcuate parts have a protruding portion limiting the respective rotation of the inner and outer profile members;

b) the arcuate parts of the inner profile member are extended by turned down parts;

c) the connecting parts surround the turned down parts;

d) the sliding or rolling members are made by small balls;

e) the inner and outer profile members are made of a slightly flexible and resilient special steel.

Various other features of the invention are moreover revealed from the following detailed description.

BRIEF DESCRIPTION OF THE DRAWINGS

An embodiment of the invention is shown as a non limiting example in the accompanying drawings, wherein.

DETAILED DESCRIPTION OF THE INVENTION

Figure 1:
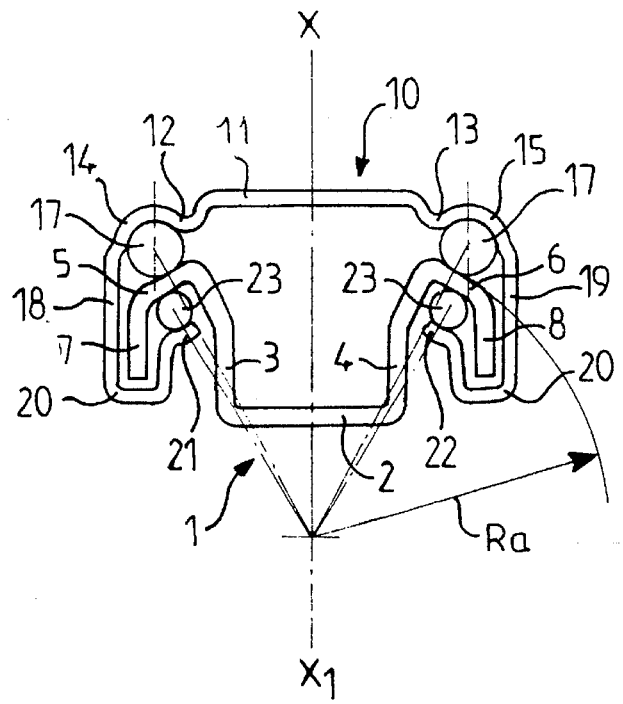
FIG. 1 is a cross-section of the slide at the mean position thereof, when the slide is locked.

Refering now to the drawings, FIG. 1 shows a cross-section of the slide of the invention which comprises an inner profile member which has, in cross-section, a plane or flat base 2 overtopped by vertical wings 3, 4 perpendicular to the plane or flat base 2. The wings 3, 4 of the profile member are extended by arcuate parts 5, 6 ending with turned down parts 7, 8 that are substantially parallel to the median vertical axis X-X1 of the slide.

The outer profile member 10 of the slide has a position which is inverted relatively to the inner profile member 1 and comprises an upper plane or flat portion 11 edged symmetrically with respect to the axis X-X1 by two grooves 12, 13 having for functions:

a) to stiffen the upper plane or flat portion 11 of the upper profile member 10, i.e. to stiffen the slide as a whole;

b) to delimit on both sides of these grooves 12, 13 two guiding paths 14, 15 in which are positioned sliding or rolling members and typically small balls 17, generally four or six in number, longitudinally spaced apart by suitable means, preferably by cylindrical parts, not shown, of a sufficient length and the diameter of which is practically equal to the diameter of the small balls 17. The assembly made by the small balls and cylindrical parts can slightly move in the longitudinal direction between abutments rigidly connected to the ends of the lower profile member.

Finally, the connecting parts 18, 19 which extend the guiding paths 14, 15 of the outer profile member 10, are vertical and parallel to the axis X-X1 for then ending by U-shaped parts 20 surrounding the turned down parts 7, 8 of the inner profile member 1. The free ends of these U-shaped parts 20 are formed with second guiding paths 21, 22 of an arcuate shape and supporting sliding or rolling members such as small balls 23, having generally a diameter smaller that of the small balls 17, and which center the outer profile member 10 with respect to the inner profile member 1.

Figure 2:
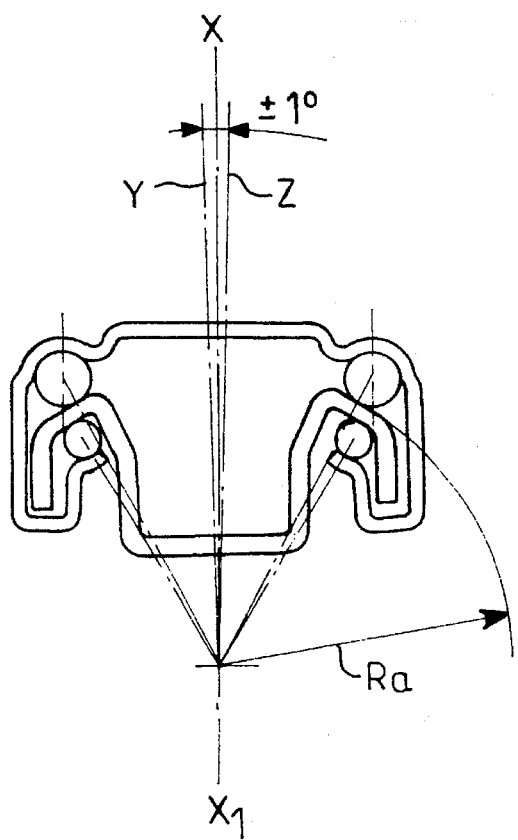
FIG. 2 is a cross-section of the slide showing possible lateral displacements by ±1°.

It is perfectly clear from the above disclosure that the arcuate shape of the parts 5, 6—each placed between a small ball 17 and a small ball 23—permits a slight rotation of the inner profile member around the axis X-X1, and this by a few angular degrees, and for example ±1° as diagrammatically shown in FIG. 2. Angular defects of the seat and floor fixation areas are thus permitted without stresses exerted on the slide.

The sliding force is extremely low since the small balls 17, 23 provide a perfect flexible and noiseless rectilinear movement, particularly if it is possible to use metallic small balls, or small balls made of a greasy and high resistant plastics material, avoiding thereby noise and clearance.

Figure 3:
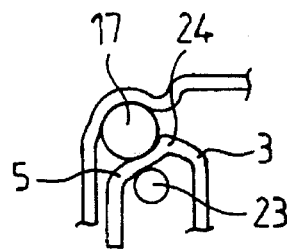
FIG. 3 shows an improvement of the invention.

FIG. 3 shows an improvement of the invention and illustrates a protruding portion 24 preventing an excess rotation of one profile member with respect to the other profile member. Such a protruding portion is located at the connection between each of the wings 3, 4 and each of the arcuate parts 5, 6.

Moreover, the slide is provided in a conventional manner, with a locking member (not shown) positioned between the inner profile member 1 and the outer profile member 10, this locking member being controlled, for the two parallel slides supporting a seat, by means of a control element which is either frontwardly or laterally offset with respect to the seat.

We claim:

1. Slide for adjusting the longitudinal position of an automobile seat, comprising an inner profile member and an outer profile member, and wherein:

a) the inner profile member (1) has a U-shaped cross-section extended by arcuate parts (5, 6);

b) the outer profile member (10) comprises an upper plane portion (11) edged in a symmetrical manner with respect to a median vertical axis X-X1 by first guiding paths (14, 15) extended by connecting parts (18, 19) linking together said first guiding paths with second guiding paths (21, 22), first sliding or rolling members (17) being inserted between said first guiding paths (14, 15) and said arcuate parts (5, 6), and second sliding or rolling members (23) being inserted between said arcuate parts (5, 6) and said second guiding paths (21, 22), said arcuate parts thereby permitting a slight relative rotation of said inner and outer profile members.

2. A seat slide as set forth in claim 1, wherein said outer profile member (1) comprises a groove (12, 13) and wherein said upper plane portion (11) has two ends, said groove being provided between each of said two ends and said first guiding paths, and permitting to increase an envelope for said first sliding or rolling members.

3. A seat slide as set forth in claim 1, wherein said arcuate parts each have a protruding portion (24) limiting the relative rotation of said inner and outer profile members.

4. A seat slide as set forth in claim 1, wherein said arcuate parts are extended by turned down parts (7, 8).

5. A seat slide as set forth in claim 4, wherein said connecting parts (18, 19) surround said turned down parts (7, 8).

6. A seat slide as set forth in claim 1, wherein said first and second sliding or rolling members are made by small balls (17, 23).

7. A seat slide as set forth in claim 1, wherein said inner and outer profile members (1, 10) are made of a slightly flexible and resilient special steel.

8. A seat slide as set forth in claim 1, wherein said guiding paths are provided with means for spacing apart said sliding or rolling members.

\* \* \* \* \*